United States Patent [19]

Baker

[11] Patent Number: 5,078,652

[45] Date of Patent: Jan. 7, 1992

[54] CONVOLUTED BOOT AND SEAL

[75] Inventor: W. Howard Baker, Hartsville, Tenn.

[73] Assignee: Wynn's-Precision, Inc., Lebanon, Tenn.

[21] Appl. No.: 537,980

[22] Filed: Jun. 14, 1990

[51] Int. Cl.$^5$ .............................................. F16D 3/84
[52] U.S. Cl. .............................. 464/175; 277/212 FB
[58] Field of Search ............... 464/175, 173, 143, 146; 277/217, 221, 216, 212 FB, 189

[56] References Cited

U.S. PATENT DOCUMENTS

| 1,370,940 | 3/1921 | Ashley | 277/221 |
| 4,102,419 | 7/1978 | Klima | 277/221 X |
| 4,936,811 | 6/1990 | Baker | 277/212 FB X |

FOREIGN PATENT DOCUMENTS 492080 9/1938 United Kingdom ................ 277/221

Primary Examiner—Daniel P. Stodola
Assistant Examiner—Tony A. Gayoso
Attorney, Agent, or Firm—Biebel & French

[57] ABSTRACT

An elastomer boot and sleeve combination for sealing a blow-molded boot to a cylindrical member, such as a shaft, includes an intermediate sleeve which is received between the neck of the boot and the shaft. The sleeve is split and is formed with a pair of forks at one end and a tongue which is received between the forks at the other end. The tongue and forks are formed with inclined surfaces along their mating walls such that the tongue is captured between the forks when the sleeve, which is molded in a semi-open position, is closed about the shaft. The neck of the boot is formed with protuberances which engage the walls of outwardly-opening recesses in the forks so that when the neck is clamped down on the sleeve a force is created which urges the forks together toward each other and against the tongue, thereby forming an effective clamp which seals the neck of the convoluted boot to the shaft.

2 Claims, 2 Drawing Sheets

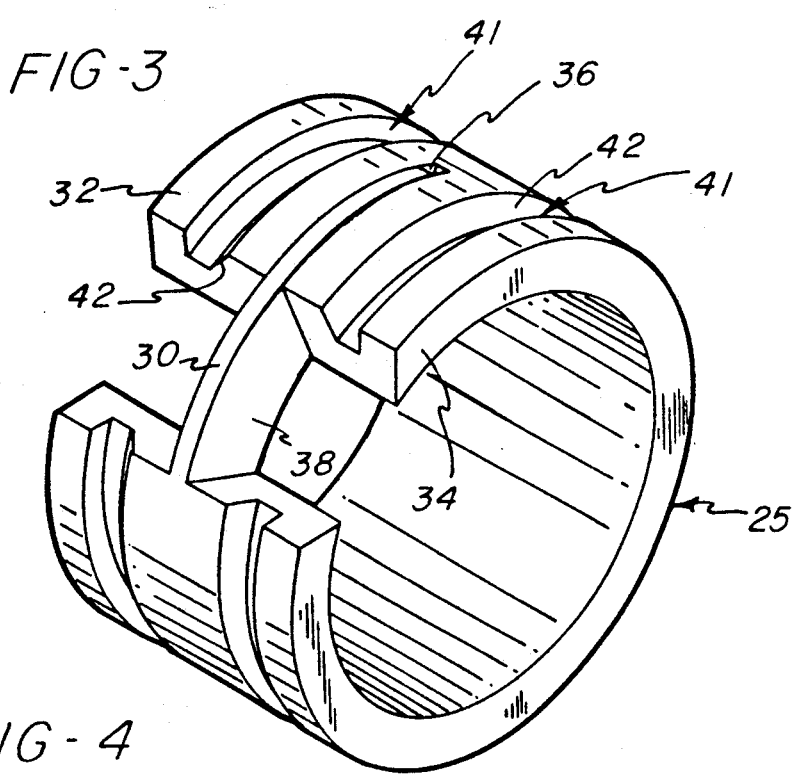
FIG-3
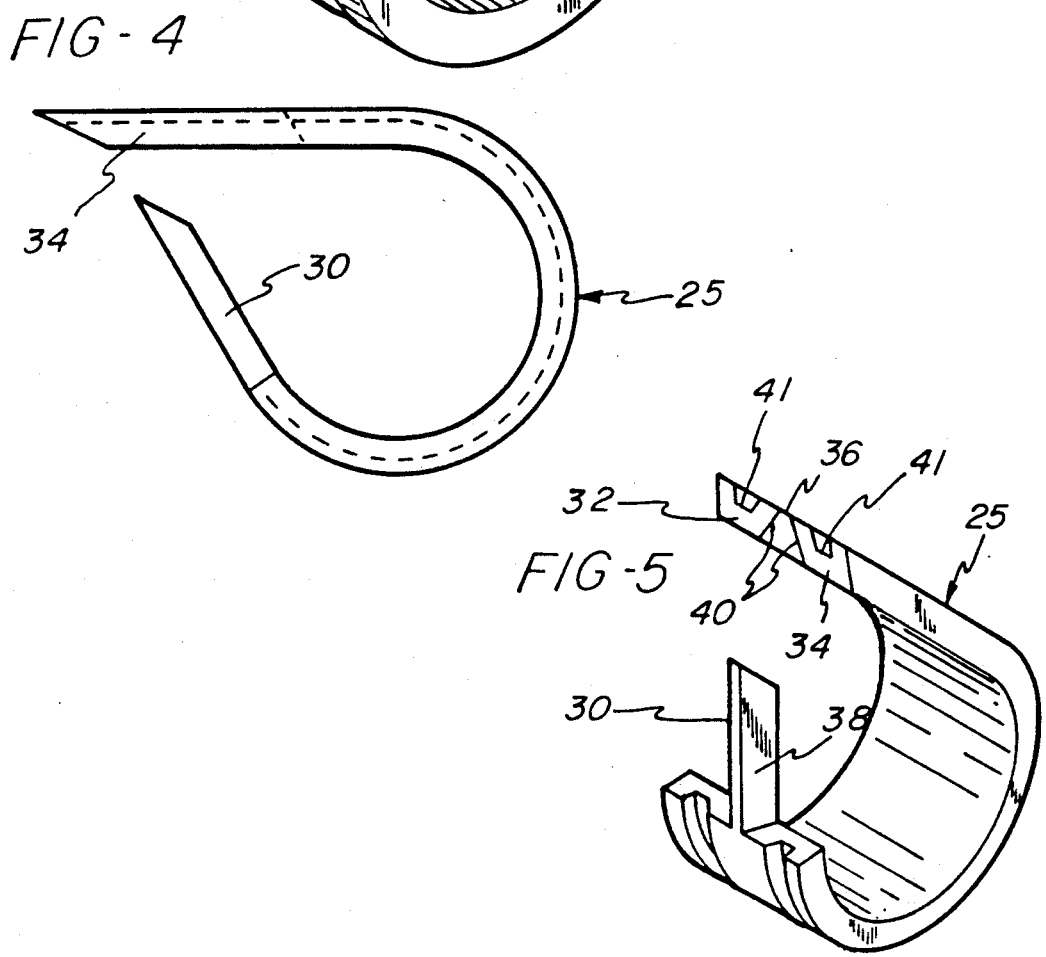
FIG-4
FIG-5

CONVOLUTED BOOT AND SEAL

BACKGROUND OF THE INVENTION

This invention relates to the retention of molded convoluted boots on axles and shafts, such as associated with constant velocity joints.

In U.S. Pat. No. 4,786,272 issued Nov. 22, 1988 to Baker, there is disclosed a blow-molded convoluted boot for use with constant velocity joints. As discussed in that patent, constant velocity or CV joints, as used on automotive drive axles, such as on front wheel drive cars, are commonly enclosed within a convoluted elastomer boot. Such convoluted boots, that is, boots having a plurality of axially spaced annular convolutions, are commonly formed with a small end which is retained by a clamp on the drive shaft leading out of the joint, and a large end clamped to an annular surface of the body of the CV joint. Such boots provide a seal for the joint over the operating range of the constant velocity joint, which may include drive offset angles from between 0° up to 40° or more between the shaft and the joint body. Formerly such boots have been molded of rubber, which may have a hardness in the range of Shore 65A, for example, which permits the boot to flex with the flexing of the joint.

More molded boots formed of more rigid thermoplastic polyester elastomers have come into use as a substitute for the rubber boot, by reason of the greater mechanical and physical strength of such elastomers over a wide variety of operating conditions, and generally by reason of the greater toughness of such elastomers and their ability to resist puncture or tearing. However, such blow molded polymers are considerably harder and stiffer than their rubber counterparts, and may, for example, have a hardness in the range of Shore 50D and a flexural modulus of 18,009 psi or more (at 22° C.).

Typical materials from which blow-molded convoluted boots have been made are commonly referred to as thermoplastic elastomers (TPE) and include polyester, polyether, polybutylterephthalate compounds (PEEBT). Typical thermoplastic elastomer materials which are used for blow-molding convoluted boots, as defined above, include du Pont "Hytrel", HTG-5612 and Monsanto's "Santoprene" thermoplastic rubber, typically grade 103-40.

A particular difficulty arising in the clamping and sealing of the respective ends of the boot to the shaft or housing, as the case may be. For example, some instance that the small boot end or neck have a diameter sufficiently greater than that of the shaft over which it is received, for the purpose of clearing objects mounted on the shaft, such as an encircling clip on the shaft. Thereafter, it becomes necessary to provide a means for clamping the boot to the shaft.

Due to the relatively high modulus of the boot material, when a side load is applied to the boot, such as during angulation, or in other installations, during axial movement of the shaft itself, it has been found quite difficult to provide a seal therebetween. Previously, when the boot itself was made of rubber material, it was a relatively simple matter to clamp the boot to the shaft or housing, as the case may be, by compressing the same with a stepless encircling clamp. Typical boot camping arrangements are shown in Burckhardt, U.S. Pat. No. 3,511,061 issued May 12, 1970 and Ukai et al, U.S. Pat. No. 4,360,209 issued Nov. 23, 1982.

Occasionally, an intermediate spacer member or bushing may be inserted between the neck of the boot or bellows and the shaft or housing, as shown in Gehrke, U.S. Pat. No. 4,224,808 issued Sept. 30, 1980. In Gehrke, a split bushing is formed with interfitting tongues and grooves, and is positioned between the neck of the boot and the shaft. Gehrke's intermediate bushing operates as a vent sleeve and forms a spiral opening between the shaft and the sleeve for venting the interior of the boot. The interfitting tongues allow the sleeve to be collapsed about the shaft, are not configured to form a positive seal.

In Brown et al, U.S. Pat. No. 4,767,381 issued Aug. 30, 1988, a partially split sleeve 40 is threaded over the neck of the boot between the clamp and the boot neck and is compressed by the clamp for the purpose of retaining the boot in locked position on the housing of a constant velocity joint.

Sealing bushings or annular members which are softer than the boot itself and which are thus easily crushed by clamping the boot down onto the shaft are satisfactory unless high axial loads are interposed between the shaft and the boot or, in the case of the joint housing, between the housing and the boot. When an axial stress is applied, low modulus elastomers allow the boot or bellows to elongate the softer bushing in the axial direction, and this tends to decrease the outside diameter of the bushing and eventually allows the boot itself to begin to shift and roll or slide off of the bushing. The problem is particularly exacerbated where it is necessary, as previously mentioned, to provide a boot with a neck inside diameter substantially greater than the outside diameter of the body on which it is mounted, for the purpose of facilitating assembly. The gap must be filled by a bushing which provides the dual function of accurately locating and positioning the boot or bellows on the body or the shaft and forming a grease-tight seal with a high degree of integrity.

SUMMARY OF THE INVENTION

The invention is directed to a sealing arrangement by which a flexible, convoluted boot, such as a blow-molded boot, is joined to a body or a shaft by an intermediate bushing between the neck of the boot and a shaft or body. The intermediate bushing is formed with interfitted parts in which a tongue portion is captured between the space defined by a pair of forked portions. The bushing is so configured, at its outer surface, in relation to the inside surface of the boot neck so as to apply a side loading to the fork portions against the tongue portion, thereby providing an effective seal as well as providing for radial load transmission to the shaft.

To the accomplishment of this end, a bushing adapted to encircle a shaft may be molded, such as by injection molding, in an open or partially open position to facilitate the placing of the bushing onto the shaft. Thereafter, the tongue portion, preferably in the form of a tapered tongue, is positioned under correspondingly tapered walls or inner faces of a split fork. The circumference of the bushing can be decreased by causing the tongue and fork to slide, one relative to the other.

The outer surface of the bushing is formed with one or more angled surfaces which engage correspondingly angled surfaces formed on the inside of the neck of the boot. The mating surfaces between the boot neck and the bushing cause this fork portion to be pressed against the tongue when a clamp is applied to the neck.

It is accordingly an object of this invention to provide an intermediate bushing providing for the location and sealing of an injected molded convoluted boot at a shaft.

Another object of the invention is to provide a bushing and boot combination for supporting a boot on a shaft, housing, or the like, and providing an effective seal between the neck of the boot and the housing or shaft.

A still further object is the provision of an intermediate bushing which is molded in an open or semi-open position and has arcuately interfitting parts which slide one relative to the other while interlocking the same to provide a tight seal to a convoluted boot, when the boot is clamped.

These and other objects and advantages of the invention will be apparent from the following description, the accompanying drawings and the appended claims.

BRIEF DESCRIPTION OF ACCOMPANYING DRAWINGS

FIG. 3 is a perspective view of the bushing of this invention;

FIG. 4 is a side elevational view of the bushing in its semi-open molded position before being formed in a circle; and FIG. 5 is a perspective view of the molded bushing of FIG. 4.

DESCRIPTION OF PREFERRED EMBODIMENT

Figure 1:
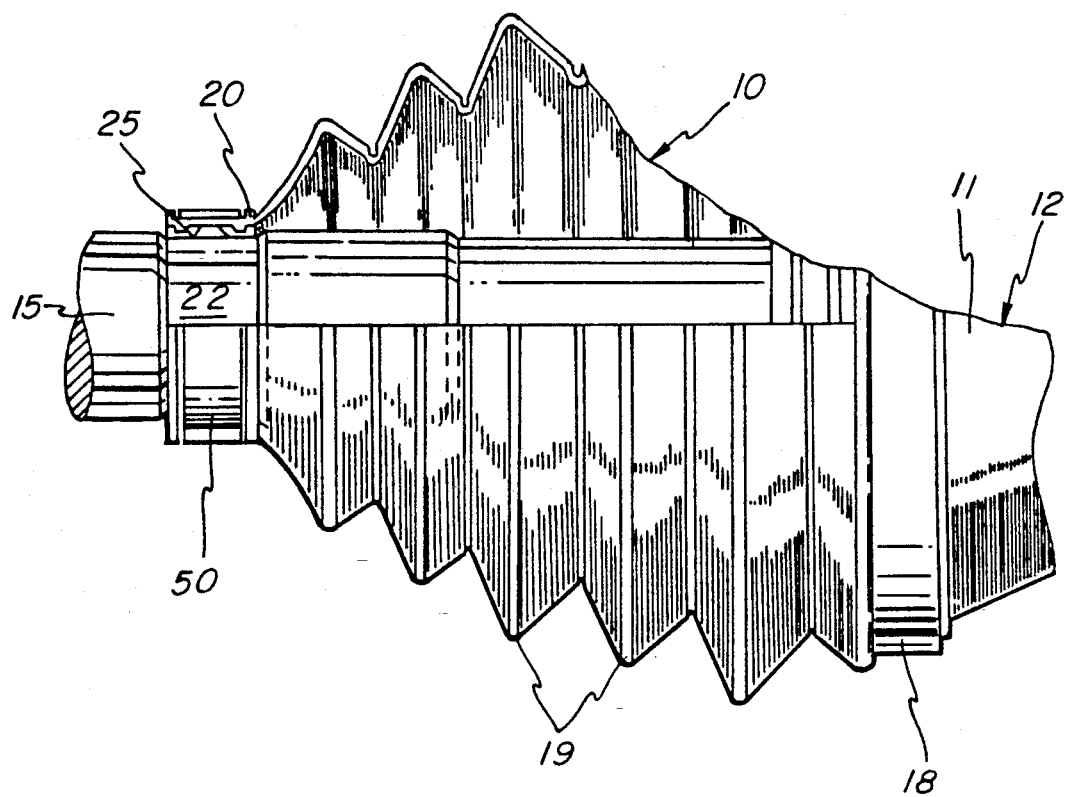
FIG. 1 is a partial sectional view showing a convoluted boot mounted on a shaft according to this invention.

Referring to the figures of the drawing, which illustrate a preferred embodiment of the invention, an injection blow molded convoluted bellows-type boot is illustrated generally at 10 in FIG. 1. The boot 10 is shown as assembled on the housing 11 of a constant velocity joint 12 having an axially extending shaft 15.

The terminal ends of the boots are formed in generally cylindrically extending necks for clamping the boot to the housing 11 of the joint 12 or the shaft 15, as the case may be, including a large diameter neck 18 proportioned to fit on the housing 11 and a smaller diameter neck 20. The necks of the boot are formed as integral parts of the blow-molded boots, with the individual convolutions 19 being spaced therebetween. The boot 10 is preferably formed of a polyester elastomer of the kind known as TPE, which typically has a relatively high stiffness, as previously described.

The embodiment of this invention is described in connection with the mounting of the smaller neck 20 of the boot 10 on the shaft 15, although it will be understood that the principles may be applied to the larger neck 18 at the large end of the boot for mounting on the body or housing 11 of the joint 12. For this purpose, the shaft 15 may be provided with an axial recess 22 of reduced diameter for locating the boot with respect to the shaft. A sleeve-like bushing 25, in accordance with this invention, is interposed between the neck 20 and the recess 22 of the shaft 15.

As previously noted, it is not always possible or feasible to mount the boot direct to the shaft. In some instances, in order to avoid making a split boot, it is necessary to form the inside diameter of the neck 20 somewhat greater than the corresponding diameter of the shaft, so that when assembled the boot and will clear obstacles or parts which may be mounted to the shaft, such as spring clips or the like. In such instance, it is necessary to insert an intermediate bushing or sleeve for the purpose of filling the radial space between the neck and the shaft due to the relative lack of compressibility of the boot material.

Soft elastomeric sealing materials, such as rubber, have been found to be generally unsatisfactory as a bushing material in those instances where axial loading is applied between the boot 10 and the shaft 15. This can occur in instances where the axis of the shaft 15 must operate at relatively high angles with respect to the body or where the shaft is caused to move axially with respect to the body. In such cases, the connections which employ softer bushing material have been known to fail prematurely, as previously described.

The problems involved in properly securing such a boot to a shaft or the like are solved, in this invention, by the provision of an interactive sleeve or bushing 25 between the neck 20 and the shaft 15. Preferably, the bushing 25 is molded of material which has a modulus of elasticity approximately the same as that of the boot 10 and may, in fact, be formed of the same material. The bushing 25 is injection molded in an open or semi-open position, as shown in FIGS. 4 and 5, for assembly over the shaft 15. The terminal or butt ends of the sleeve bushing are formed with interlocking means in the form of a central tongue 30 formed on one butt end thereof positionable between a bifurcated or forked section at the other end comprising forks 32 and 34 separated by a slot 36 at the other end.

The tongue 30 is configured so as to be captured between the forks 32 and 34 when the bushing 25 is rolled into a cylinder, as shown in FIG. 3, and for this purpose, the lateral sides 38 of the tongue 30 are tapered, such as at a 45° angle to a radius line, to form an included angle of about 90°. The tapered sides form a tongue which is wider at the inside base than at the outside top.

Figure 2:
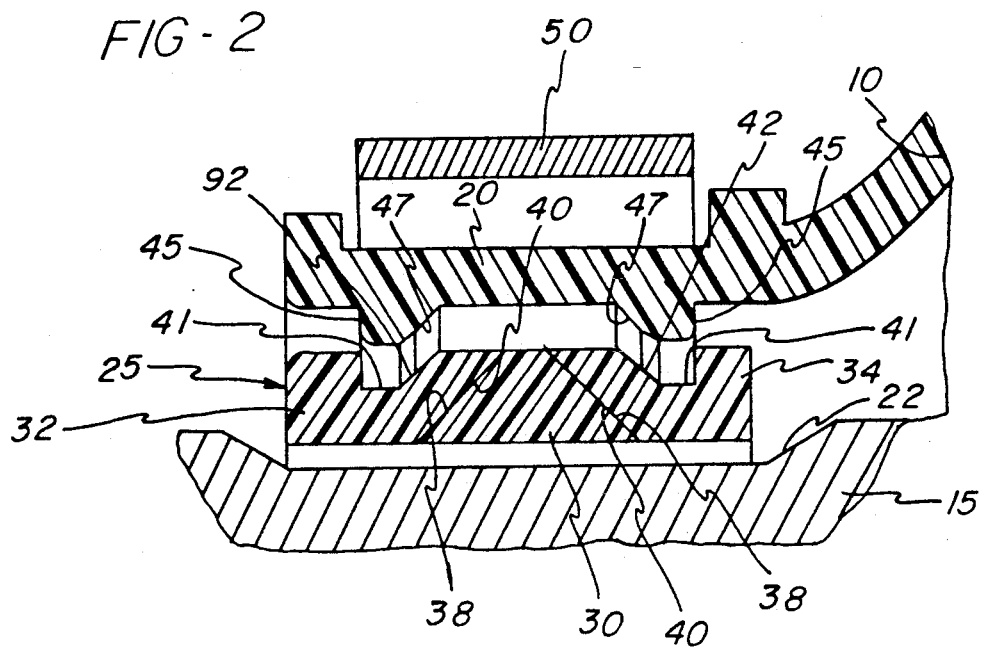
FIG. 2 is an exploded partial sectional view showing the relationship of the clamp, the neck of the boot, the bushing and the shaft.

The opposed forks 32 and 34 are formed with similar opposed and facing mating surfaces 40, each at a similar angle, as best illustrated in the sectional view of FIG. 2, so that when the tongue 30 is inserted between the forks, it is captured in position but is free to slide relative to the depth of the slot 36 between the forks. Preferably, as shown in FIG. 3, the slot 36 is slightly longer than the tongue so as to permit the compression of the sleeve about the shaft surface 22 without interference between the end of the tongue and the end of the slot.

An interface seal between the tapered tongue surfaces 36 and the corresponding inside surfaces 40 of the forks 32 and 34 is assured by causing the forks to be biased toward each other, thereby tending to close the gap defined by the slot 36 and forcing the tongue 30 against the shaft. For this purpose, the outer surface of the bushing 25 is formed with a pair of encircling grooves or recesses 41, one of which extends along each of the forks 32, 34. The recess 41 defines tapered walls 42 approximately parallel to the opposed walls of the respective fork. The recesses 40 are proportioned to receive one of a pair of annular protuberances 45 formed as an integral part of the joint neck and having opposed inside tapered surfaces 47 which are proportioned to engage the tapered surfaces 42 at the respective forks, when the parts are assembled.

In order to apply an axial loading to the forks and to the tongue 30 of the bushing 25, the distance between the opposed of the faces 47 formed on the protuberances or bosses 45 of the neck should be somewhat less than the distance between the bushing faces 42, in the order of approximately 10%. This value, while typical, will vary inversely as the width of the bushing varies, that is, a greater distance between the protuberances 45 would require a less difference, in percentage, between the mating surfaces 47 of the protuberances 45 on the neck of the boot and the mating walls 42 formed in the forks of the bushing 25. In addition, the distance between the two outer tapered surfaces 38 of the tongue 30 may be somewhat greater than the corresponding distance between the opposed inner faces or walls 40 of the forks, in the order of about 5%. This will provide sufficient interference so as to place the bushing 25 in axial strain when the tongue 30 is captured between the forks 32 and 34.

The operation of the invention which has been described thus far is believed to be apparent from the foregoing description. The open sleeve 25 is assembled on the shaft 20, in the position of the locating surface or recess 22 and the tongue 30 is then initially captured between the opposing forks 32 and 34. The neck 20 of the boot 10, which has an inside diameter proportioned to be received about the outer surface of the sleeve, is assembled loosely thereover. Thereafter, a clamp 50, which may be a stepless clamp, is assembled about the neck and drawn tight. The exploded view of the parts is shown in FIG. 2, but it will be understood that the parts are assembled in reasonably close position with the protuberances 45 received and located within the outwardly opening annular recesses formed on the sleeve 25. Tightening of the clamp causes the tapered surfaces 47 to press against the mating surfaces 42, tending to force the forks toward each other and tending to close the space defined by the slot 36. While this forces each of the forks firmly against the shaft 15, and while it causes the tongue 30 to slide arcuately within the slot, it also forces the tongue firmly against the shaft. A seal is thus formed by the bushing 25 which does not depend for its integrity on the compression of a softer elastomeric material. The bushing 25 has high strength, and lockingly forms, in the assembled position, a support between the boot neck 20 and the shaft 15. The relative taper between the engaging surfaces 47 of the annular bosses 45 and the mating recesses 41 of the forks create, in the clamped condition, a high compression seal at the tapered interfaces between the tongue and the fork, thereby providing an effective internal seal within the boot.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An elastomer boot and sleeve combination for the sealing of a boot end to a cylindrical shaft, comprising:
   an axial end neck formed on said boot,
   a sleeve proportioned to be received between said end neck and said shaft, said sleeve having mutually interfitting arcuately movable portions including a tongue between a pair of forks,
   means on said sleeve between said tongue and forks for retaining said tongue between said forks including opposed facing tapered walls on said tongue and mating tapered walls on each lateral side of said forks which press said tongue against said shaft when said forks are urged axially together,
   contacting means between said sleeve and said neck for urging said forks axially of said shaft and against said tongue when said neck is subject to a radially compressive retaining force provided by an encircling retainer claim, and
   said co-acting means including an outwardly-facing recess formed on an outer surface of each of said forks, and generally radially inwardly-extending protuberances formed on an inside surface of said neck, one protuberance for each of said recesses, said protuberances proportioned to engage a wall of the associated said recess for urging said forks axially toward each other and against said tongue when said neck is clamped about said sleeve.

2. A convoluted sealing boot for a shaft, in which a radial space is formed between a neck of such boot and an outer surface of the shaft, comprising:
   an annular bushing proportioned to be received in the radial space between said neck and the shaft outer surface,
   said bushing being split thereby forming opposed ends and formed with internesting overlapping portions in the form of a tongue portion on one end and a tongue-receiving forked portion on the opposed end,
   said tongue portion being proportioned to be received in a space between the forks of said forked portion during the clamping of said neck about said bushing,
   means between said overlapping portions radially interlocking said tongue portion to said forked portion while providing for circumferential sliding movement of said tongue portion with respect to said forked portion during said clamping, and
   cooperating means between an inner surface of said neck and an outer surface of said bushing at said forked portion for urging the forks of said forked portion axially against said tongue portion during said clamping.,
   said tongue portion being formed with tapered side walls which are spaced apart wider at the radial inside than at the radial outside of said bushing, said forked portion having mating facing side walls which engage the corresponding side walls of said tongue portion, the radial outer surface of each of the forks of said forked portion are formed with circumferential recesses and the opposed inner surface of said neck are formed with circumferential protuberances, said recesses and protuberances having mutually abutting circumferential walls inclined to cause the forks of said forked portion to move axially toward each other and against said tongue portion when said boot neck is clamped about said bushing.

* * * * *

UNITED STATES PATENT AND TRADEMARK OFFICE
CERTIFICATE OF CORRECTION

PATENT NO. : 5,078,652

DATED : January 7, 1992

INVENTOR(S) : W. Howard Baker

It is certified that error appears in the above-identified patent and that said Letters Patent is hereby corrected as shown below:

Claim 1, Col. 6, line 9, "contacting" should be --coacting--.

Signed and Sealed this

Twenty-third Day of March, 1993

Attest:

STEPHEN G. KUNIN

Attesting Officer

Acting Commissioner of Patents and Trademarks